United States Patent [19]

Lawton et al.

[11] Patent Number: 4,904,073
[45] Date of Patent: Feb. 27, 1990

[54] FRACTAL TILING FOR MULTIPLE MIRROR OPTICAL DEVICES

[75] Inventors: Wayne M. Lawton; Howard L. Resnikoff, both of Cambridge, Mass.

[73] Assignee: Aware, Inc., Cambridge, Mass.

[21] Appl. No.: 230,529

[22] Filed: Aug. 10, 1988

[51] Int. Cl.$^4$ .............................................. G02B 7/18
[52] U.S. Cl. .................................. 350/613; 350/611; 350/616
[58] Field of Search ................ 350/611, 613, 616, 627

[56] References Cited

U.S. PATENT DOCUMENTS

| | | | |
|---|---|---|---|
| 3,923,382 | 12/1975 | Harding | 350/613 |
| 4,202,605 | 5/1980 | Heinz | 350/616 |
| 4,568,156 | 2/1986 | Dane | 350/613 |
| 4,611,891 | 9/1986 | Dane | 350/613 |

OTHER PUBLICATIONS

Mast et al., "Figure Control for a Fully Segmented Telescope Mirror," *Applied Optics*, vol. 21, No. 14, 15 Jul. 1982, pp. 2631–2641.

"Introduction to Fourier Optics" Joseph Goodman, McGraw Hill, N.Y., 1968, pp. 57–65.

"Mathematical Games", *Scientific American*, Dec. 1976, Martin Gardner, pp. 124–133.

*Primary Examiner*—Bruce Y. Arnold
*Assistant Examiner*—Martin Lerner
*Attorney, Agent, or Firm*—Spencer & Frank

[57] ABSTRACT

A multiple mirror reflective surface for use in a multiple mirror telescope in which the objective surface of telescope is tiled with substantially identical planar mirrors having irregular boundaries and a mirror for use therein. The mirrors are groupable into groups of seven, one of which is bounded symmetrically by the other six, each mirror having an approximately fractal peripheral boundary such that each group of seven mirrors has a boundary shape which is approximately geometrically similar to that of the mirrors forming the group. The mirrors of such an array have their centers on a hexagonal lattice of points in the objective surface. In a particular embodiment, the mirrors have shapes which approximate that of a fractal shaped mirror by being defined by a combination of hexagonal shapes. With mirrors of this shape, the multiple mirror telescope experiences less optical aberrations which would otherwise be caused by linear edges of the mirrors, without reducing light gathering power.

10 Claims, 5 Drawing Sheets

FIG. I

FRACTAL TILING FOR MULTIPLE MIRROR OPTICAL DEVICES

BACKGROUND OF THE INVENTION

This invention relates to optical devices such as reflecting mirror telescopes that employ a single multifaceted objective surface on which are located multiple mirrors, each mirror being oriented nearly orthogonal to the optical axis and whose location along the optical axis can be moved, independent of and unconstrained by the physical locations of the remaining mirrors. In the case of multiple mirror telescopes, moving the mirrors permits compensation for aberrations, induced by the propagation of light from a stellar object through a turbulent atmosphere, to a degree sufficient to establish a continually focused image of the stellar object. Such a telescope is disclosed in an article entitled *Proceedings of SPIE, The International Society for Optical Engineers*, pg. 109-0116 (1982) Vol. 332, pg. 109-116, University of California Ten Meter Telescope Project, by Jerry E. Nelson.

FIG. 1 illustrates a standard single mirror parabolic reflector 1 for a telescope. The objective surface 2 is described by the equation $$Z = (X^2 + Y^2)/(2r) \text{ for } X^2 + Y^2 \leq D^2 \quad (1)$$

where r is the radius of curvature of the parabolic surface and D is the diameter of the parabolic surface. In conventional telescopes, $D << r$ (i.e. D is small compared with r) and all observed stellar point objects lie in a direction almost parallel to the optical axis, which coincides with the Z axis. It is well known to those skilled in the art that an observed stellar point object p located in a direction specified by the unit vector $$V = (\cos(\theta)\sin(\phi), \sin(\theta)\sin(\phi), \cos(\phi)) \quad (2)$$

will form an image I(p) centered about the point $$Q = (F\cos(\theta)\sin(\phi), F\sin(\theta)\sin(\phi), F) \quad (3)$$

and lying within the focal plane defined by the equation $Z = F$ where $F = r/2$ is the focal length of the telescope, $\phi$ is the angle between the Z axis and the vector V and $\theta$ is the angle between the X axis and the projection of vector V onto the X, Y plane. See, for example, the text, "Introduction to Fourier Optics", Joseph Goodman, McGraw Hill, NY, 1968.

In the absence of aberrations induced by either the propagation of light through a turbulent atmosphere or by irregularities in the shape of the telescope objective, the distribution of light intensity in the focal plane of the telescope is described by an Airy pattern. See, the above cited Goodman text at pages 64, 65. Light intensity falls off from a maximum value at the center Q of the image I(p) to a value of zero in a circle centered at Q and having radius $(j_1/\pi)FL/D$ where L=wavelength of light emanating from p and $j_1 \approx 1.220\pi$ is the smallest positive root of the Bessel function $J_1(x)$. This corresponds to an angular resolution equal to $(j_1/\pi)L/D$.

The presence of atmospheric turbulence distorts the Airy pattern and increases the numerical value for the angular resolution to approximately $(j_1/\pi)L/s$ where s is the extent of the smallest optically significant atmospheric disturbance. At sea level typically $s \approx 0.1$ meter. The extent s decreases with increased turbulence and increases with altitude. Since $s << D$ for typical large conventional telescopes, increasing the diameter of a telescope beyond s increases image brightness in proportion to $D^2$ but the resolving power is not increased. The resolution of a single mirror telescope can only be increased by increasing its altitude by locating it on a mountain peak or in orbit about the Earth.

An alternate approach to achieving improved resolution of telescopes employs active optical imaging to compensate for atmospheric turbulence. Active optical imaging employs (1) an interferometric mechanism to measure the effective path-length error W(X,Y) that quantifies the atmospheric distortion as a function of objective plane X,Y coordinates, and (2) an activator mechanism to deform the objective surface of the telescope in the direction of the optical axis by W(X,Y)/2, thereby offsetting the atmospheric effects.

Multiple mirror telescopes are active optical imaging devices that eliminate the practical problems intrinsic to the construction and operation of a single large deformable mirror. FIG. 2 illustrates in plan view a conventional multiple mirror telescope 3 employing hexagonal shaped mirrors 4. Alternate designs may employ disks centered on points in a hexagonal lattice or squares centered on points in a square lattice. Practical telescopes require many times the number of mirrors illustrated in FIG. 2. Since $D << r$, it is convenient to assume throughout the remainder of this disclosure that the surface of each mirror element of a multiple mirror telescope is planar.

The advantage of using hexagonal, rectangular, or triangular shaped mirror elements rather than disk-shaped mirror elements is that the objective surface of the telescope scope can be tiled using regular hexagons, rectangles or triangles, but the objective surface cannot be tiled using disks. An increase of 11.027% more light gathering power is attained by using mirror element shapes to tile the objective surface of the telescope compared with using circular discs.

The disadvantage of using hexagonal, rectangular, or triangular shaped mirror elements is that optical aberrations are introduced into the image by the linear edges of each element.

SUMMARY OF THE INVENTION

It is therefore an object of the invention to provide a multiple mirror reflective surface for a telescope in which optical aberrations caused by linear edges of the mirrors is reduced without reducing light gathering power.

This object is met by a multiple mirror reflective surface in which an objective surface is tiled with substantially planar mirrors having irregular boundaries, and in particular by an array of substantially identical mirrors which are groupable into groups of seven, one of which is bounded symmetrically by the other six, each mirror having an approximately fractal peripheral boundary such that each group of seven mirrors has a boundary shape which is approximately geometrically similar to that of the mirrors forming the group. The mirrors of such an array have their centers on a hexagonal lattice of points in the objective surface. Also in accordance with the invention is for each mirror to have a shape which approximates that of a fractal shaped mirror by being defined by a combination of hexagonal shapes to be described below.

BRIEF DESCRIPTION OF THE DRAWINGS

These and other features and advantages of the invention will be more fully described in the following detailed description of the preferred embodiments with reference to the accompanying drawings in which.

DETAILED DESCRIPTION OF THE PREFERRED EMBODIMENTS

Figure 1:
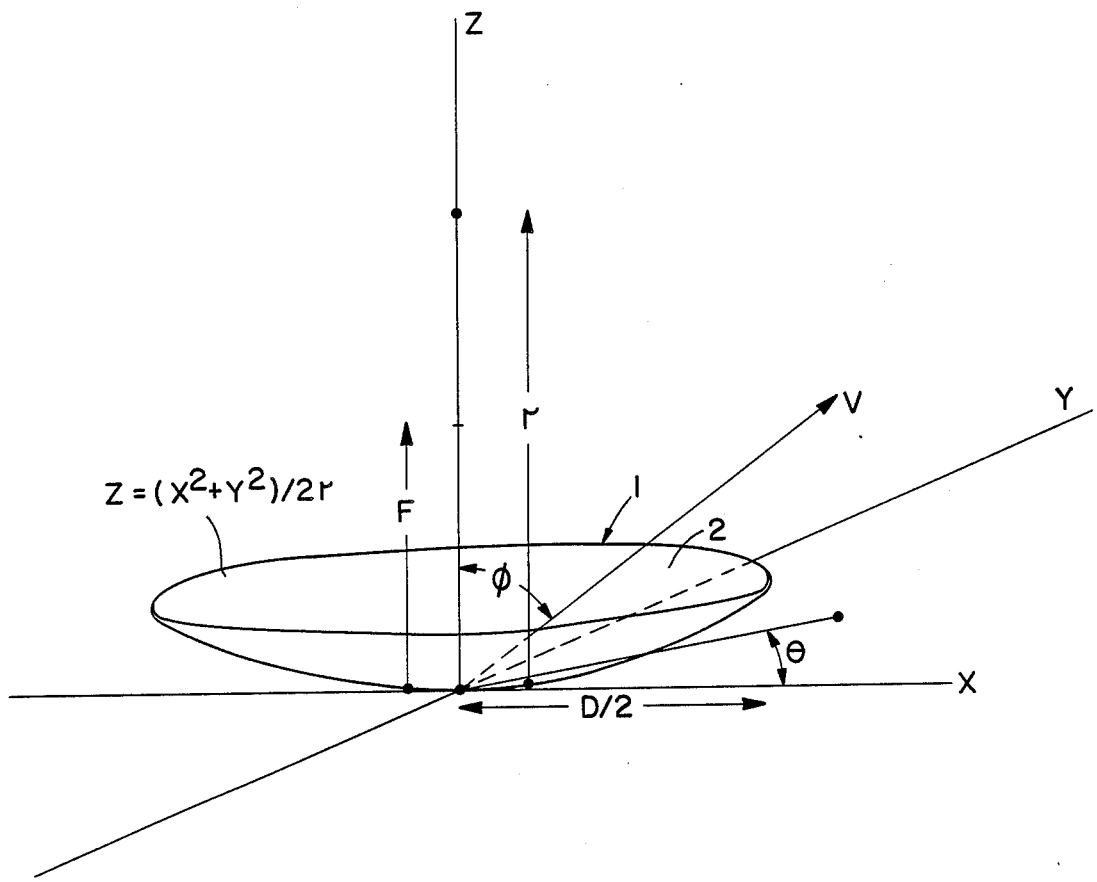
FIG. 1 is a graphical representation of the objective surface of a multiple mirror telescope.
Figure 2:
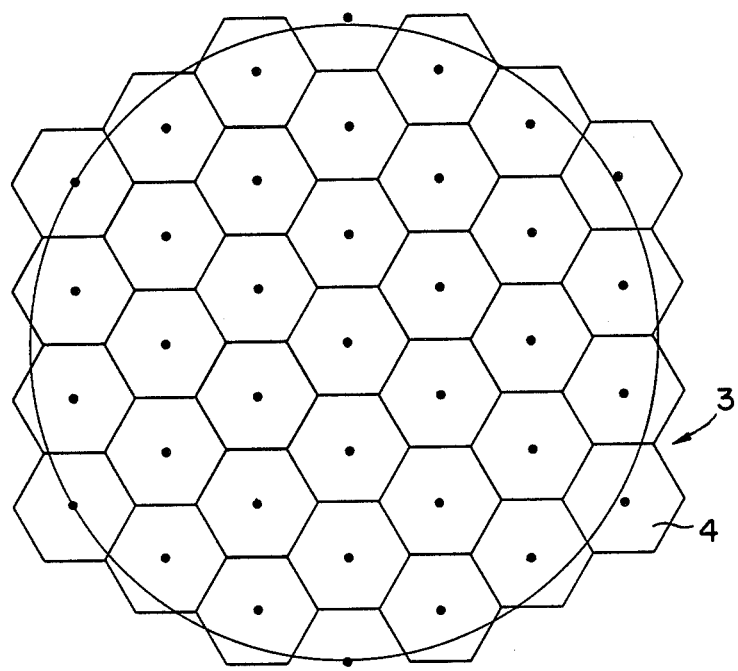
FIG. 2 is a view along the Z axis of a conventional hexagonal multiple mirror reflective surface for a multiple mirror telescope.
Figure 3:
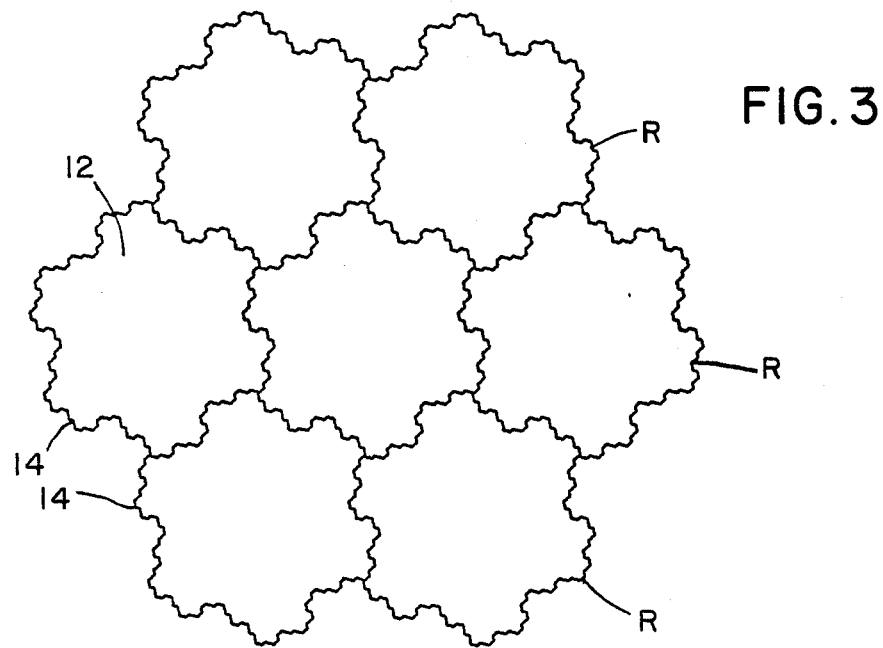
FIG. 3 is a view along the Z axis of a group of seven mirrors of fractal shape of a multiple mirror reflective surface in accordance with an embodiment of the invention.
Figure 6:
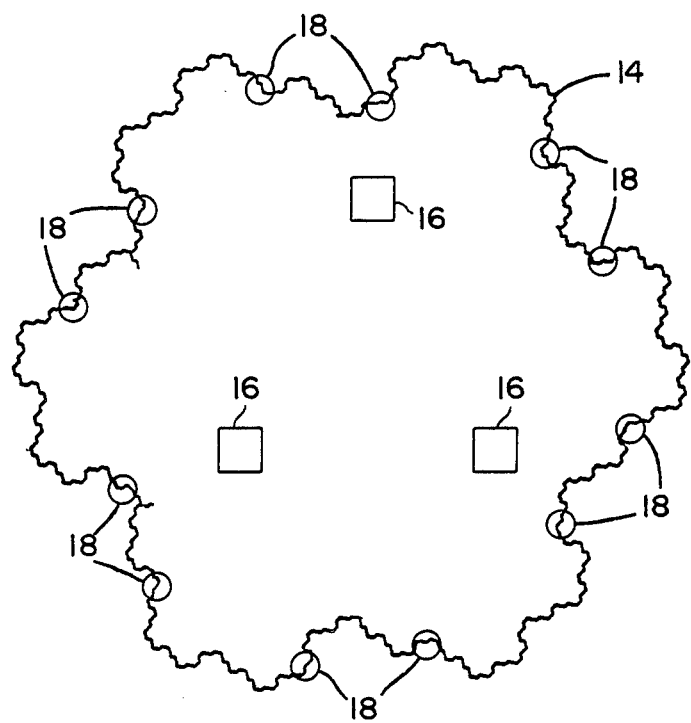
FIG. 6 schematically illustrates the rear side of a single mirror portion of the multiple mirror reflective surface in accordance with the invention having detectors and actuators for sensing and actuating displacements of the mirror.

Referring to FIG. 3, there is schematically illustrated a portion of the front surface of a multiple mirror reflective surface in accordance with a preferred embodiment of the invention. The multifaceted reflective surface 12 is formed of approximately fractal shaped flat mirrors 14 to be described in detail below. The reflective surface is otherwise of substantially known design such as is described in the SPIE publication referred to above and may therefore be obtained simply by replacing the hexagonal mirrors of the prior telescope with these mirrors 14. Referring to FIG. 6, the mirrors 14 are each individually displaceable in a known manner generally parallel to the optical axis of the reflective surface 12, with the aid of conventional displacement actuators 16 and displacement sensors 18 such as are disclosed in the SPIE publication. The mirrors 14 may be mounted and controlled in a conventional manner substantially as disclosed in the SPIE publication.

FIG. 3 illustrates mirrors in the shape of a non-polygonal, non-convex planar region R, having an irregular fractal boundary, that can be used to tile a telescope objective by translates of itself, in accordance with one embodiment of the invention. As geometric shapes only, these shapes are known, for example from Benoit B. Mandelbrot, *Fractals: Form, Chance and Dimension*, W. H. Freeman, San Francisco, 1977; and Martin Gardner, "Mathematical Games," Scientific American, Dec. 1976. As illustrated in FIG. 3, a union of one such region with six translates thereof forms a region that is geometrically similar to the original region. Such mirrors with a spherical surface, all of the same uniform radius of curvature, will have the same property.

Figure 4A:
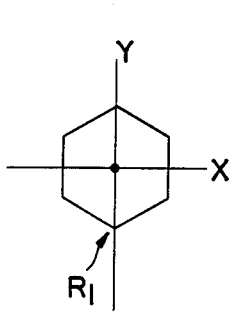
FIG. 4A, 4B, and 4C illustrate successive polygonal approximations to a fractal shaped mirror in accordance with other embodiments of the inventions.
Figure 4B:
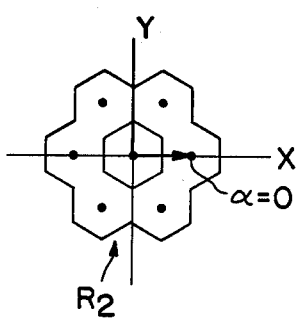
Figure 4C:
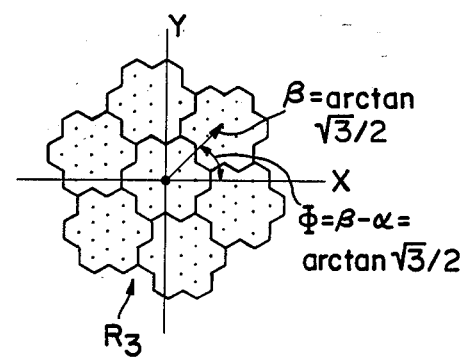
Figure 5A:
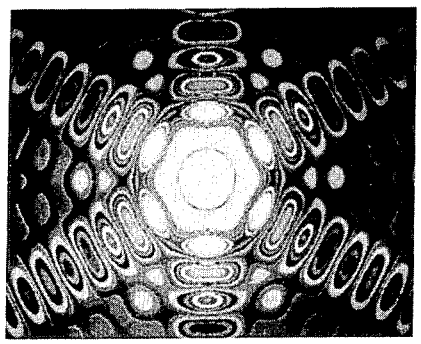
FIGS. 5A and 5B show aberration patterns in accordance with a prior art multiple mirror telescope having hexagonal mirrors, respectively illustrated by near and far sidelobes.
Figure 5B:
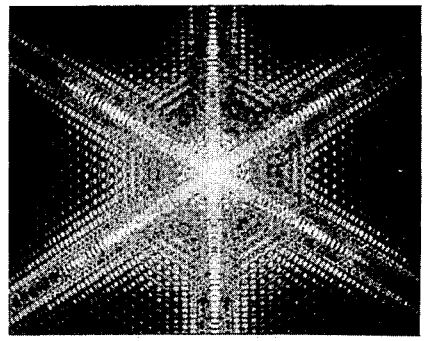
Figure 5C:
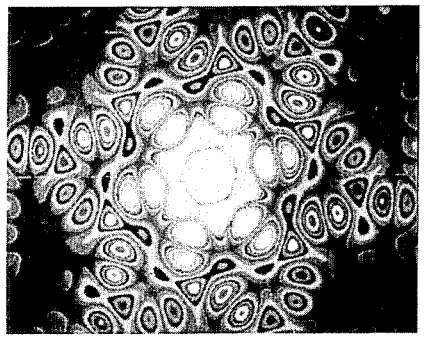
FIGS. 5C and 5D show aberration patterns in a multiple mirror telescope incorporating a multiple mirror reflecting surface according to the invention having approximately fractal mirrors, respectively illustrated by near and far sidelobes.
Figure 5D:
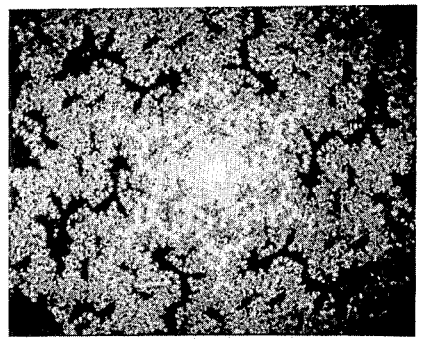

FIGS. 4A–4C illustrate three successive approximations to the region R. The first region consists of a hexagonal region $R_1$ having sides of length S and oriented having two sides parallel to the Y axis. The second region $R_2$ is formed by first scaling (multiplying) the lengths S of the sides of region $R_1$ by the factor $1/\sqrt{7}$ and then appending six contiguous translates of the shrunken region to itself. The third region is formed in an analogous manner; however, the six translates lie in directions (defined by angle $\beta$ in FIG. 4C) that are rotated by an angle $\Phi = \arctan(\sqrt{3}/2)$ with respect to the previous set of directions (defined by angle $\alpha$ in FIG. 4B). The successive regions can be defined inductively by the rule $$R_{N+1} = (aR_N)U(U_{M=0,1,2,3,4,5}(aR_N + (X(M,N), Y(M,N)))) \quad (4)$$

where $a = 1/\sqrt{7}$, "U" represents union, and the translation vector $(X(M,N), Y(M,N))$ is defined by $$X(M,N) = \sqrt{3}S \cos(\pi M/3 + (N-2)\Phi) \quad (5)$$

$$Y(M,N) = -\sqrt{3}S \sin(\Phi M/3 + (N-2)\Phi) \quad (6)$$

and angles are in radians. Thus, $R_{N+1}$ is the union of a region $aR_N$ and six copies thereof translated distances and directions defined by the translation vectors $X(M,N)$, $Y(M,N)$, $M = 0,1,2,3,4,5$. Each of the regions have area $3\sqrt{3} S^2/2$ and can be used to tile the plane by placing their centers at the points of a hexagonal lattice. Furthermore, as N gets large, $R_N$ approaches the fractal region illustrated in FIG. 3. One advantage of using these approximations is to facilitate fabrication, since $R_N$ is simply a polygon having $2 \times 3^N$ linear sides having identical length. Another reason is that it is easy to shrink $R_N$ normal to its boundary by a small amount to insure that the mirrors will fit together and admit small changes in location.

The main advantage of using mirrors having the shape of region R, or an approximation $R_N$, instead of regular hexagons or other simple polygons in multiple mirror telescopes, is that it reduces the peak diffraction sidelobe artifacts that occur in a direction normal to significantly long edges of the mirrors. The origin of these artifacts arises from the following three facts describing the aberrations in multiple mirror telescopes:

(i) it is not possible to exactly measure nor compensate for the path-length error W(X,Y), (ii) if the diagonal length of each mirror is approximately equal to the extent s of the smallest optically significant atmospheric disturbance, then the resulting phase error is approximately constant over each mirror and statistically independent from mirror to mirror, and (iii) the intensity distribution in the focal plane resulting from the image of a steller point source is a translation of the squared modulus or the intensity of the Fourier transform of the pupil function—the latter being equal to the complex exponential of the phase error function over the telescope objective and equal to zero outside the telescope objective.

In order to describe the peak diffraction sidelobe artifacts and compare the relative decrease of these artifacts obtained by using our invention in comparison to the prior art, it is necessary to present a simple derivation of the dependence of the average intensity pattern in a multiple mirror telescope on the shape of the individual mirrors. Let C denote the characteristic function of the region describing the shape of each mirror: $C = 1$ inside the region and $C = 0$ outside the region. Let K denote the set of points formed by the centers of the regions. Then the pupil function P(X,Y,T) at time T has the form $$P(X,Y,T) = \Sigma_{(U,V) \text{ in } K} \exp(i\gamma(U,V,T))C(X-U,Y-V)$$
$$\approx C_D(X,Y) + \Sigma_{(U,V) \text{ in } K}(i\gamma(U,V,T))C(X-U,Y-V) \quad (7)$$

where $\gamma(U,V,T)$ denotes the residual phase error = 295/L times the difference between the true path length and the compensated path length at time T, which is assumed to be small, $C_D(X,Y)$ is the characteristic shape of the telescope objective which is approximately a circular disk and L is the wavelength of the image. Then the average intensity at position $(X_1,Y_1,F)$ from an image of a stellar point source radiating at wavelength L and located on the optical axis is proportional to $$B(X_1,Y_1) = <|P^\wedge(X_2,Y_2,T)|^2> \quad (8)$$

where $< >$ denotes the time averaged value over many atmospheric fluctuations, $(X_2,Y_2) = (2\pi/LF)(X_1,Y_1)$, and $P^\wedge$ denotes the two dimensional Fourier transform of P. Substituting equation (7) into equation (8), calculating the Fourier transform, and then determining the average under the assumption that $\gamma(U,V,T)$ are statistically independent time sequences at different points in K yields $$B(X_1,Y_1) = B_D(X_1,Y_1) + |C^\wedge(X_2,Y_2)|^2 \times \text{(number of mirrors)} \times \text{(variance of } \gamma) \quad (9)$$

where $B_D(X_1,Y_1)$ is the ideal Airy pattern for the telescope. Note that $|C^\wedge(X_2,Y_2)|^2$ simply represents the intensity distribution of the image of the stellar point source for a reflective surface whose objective consists of a single mirror when $X_2$ and $Y_2$ are expressed in terms of $X_1$ and $Y_1$. It represents a distorting term.

Equation (9) shows that the effect of mirror shape is to superimpose a multiple of the diffraction limited image corresponding to each mirror on the diffraction limited shape corresponding to the entire reflective surface. The severity of this distortion depends on the scaling factor, and the potential to confuse features of the distortion term with meaningful astronomical features.

Computer simulation and subsequent examination of the distortion term for both the hexagonal region and the fractal region illustrated in FIG. 3 shows that both have a mainlobe centered at $(X_1,X_1) = (0,0)$ and extending about $\sqrt{\text{(number of mirrors)}}$ times as wide as the mainlobe of $B_D(X_1,Y_1)$. This mainlobe causes no confusing features. However the distortion term for the hexagon has six major clusters of sidelobes in directions orthogonal to the edges of the hexagon. These have the potential to obscure or to be confused with nearby faint stellar point sources such as sister stars and spiral nebulae. The sidelobes for the fractal region are both reduced in peak intensity and are located in an irregular pattern. This drastically reduces the potential for introducing confusing artifacts in astronomical images.

It will be understood that the above description of the present invention is susceptible to various modifications, changes and adaptations. For example, the arrangement of mirrors in accordance with the invention is not limited to use in a telescope but could also be used for transmitting light beams such as coherent light beams. Such modifications, changes and adaptations are intended to be comprehended within the meaning and range of equivalents of the appended claims.

What is claimed is:

1. An optical device, comprising:
   a plurality of groups of mirrors, each of said groups having seven substantially identically shaped mirrors wherein one of the mirrors in each of said groups is bounded symmetrically by the other six mirrors, each mirror having an approximately fractal peripheral boundary such that each group of seven mirrors has a boundary shape of more than six sides which is approximately geometrically similar to that of each of the mirrors forming the group; and
   means for supporting said mirrors on a multifaceted objective surface, said surface having a peripheral boundary and an optical axis, each of said mirrors covering a portion of said surface so as to be oriented approximately orthogonal to said optical axis and being movable independently of, and unconstrained by the locations of the other mirrors, said supporting means including means for individually moving each of said mirrors in the direction of said optical axis.

2. A device as in claim 1, forming a multiple mirror reflective surface of a multiple mirror telescope.

3. A device as in claim 1, wherein said mirrors have planar reflecting surfaces.

4. A device as in claim 1, wherein said mirrors have reflecting surfaces with the same uniform radius of curvature.

5. An optical device, comprising:
   a plurality of groups of mirrors, each of said groups having seven substantially identically shaped mirrors, wherein one of the mirrors in each group is bounded symmetrically by the other six mirrors, said mirrors having centers disposed at the points of a regular hexagonal lattice;
   means for supporting said mirrors on and substantially covering a multifaceted objective surface, said surface having a peripheral boundary and an optical axis, each of said mirrors being oriented approximately orthogonal to said optical axis and being movable independently of, and unconstrained by the locations of the other mirrors, said supporting means including means for moving each of said mirrors individually, in the direction of said optical axis;
   defining a hexagonal region $R_1$ in an X,Y plane having equal sides of length S and oriented with two of its sides parallel to the Y axis, $(\sqrt{3})S$ being equal to the spacing between the centers at adjacent pointed of said lattice, and defining regions $R_{N+1}$ in the X,Y plane for an integer $N \geq 1$, such that $$R_{N+1} = (aR_N)U(U_{M=0,1,2,3,4,5}(aR_N + (X(M,N),Y(M,N)))),$$

where $a = 1/\sqrt{7}$, and the translation vector defined by $$X(M,N) = \sqrt{3} \cos(\pi M/3 + (N-2)\Phi) \text{ and}$$
$$Y(M,N) = -\sqrt{3} \sin(\pi M/3 + (N-2)\Phi),$$

where the angle $\Phi$ in radians is equal to arctangent $\sqrt{3}/2$, then $R_{N+1}$ defines the shape and size of each of said mirrors.

6. A device as in claim 5, forming a multiple mirror reflective surface of a multiple mirror telescope.

7. A mirror for use in a multiple mirror reflecting telescope having a large number of substantially identically shaped mirrors, said mirror having an approximately fractal peripheral boundary of more than six sides such that a group of seven such mirrors, one of which is bounded symmetrically by the other six, has a boundary shape which is approximately geometrically similar to that of each of the mirrors forming the group.

8. A mirror as in claim 7, having a planar reflecting surface.

9. A mirror as in claim 7, having a reflecting surface with a uniform radius of curvature.

10. A mirror for use in a multiple mirror reflecting telescope having a plurality of groups of mirrors, each of the groups having seven substantially identically shaped mirrors, wherein one of the mirrors in each group is bounded symmetrically by the other six mirrors, the mirrors having centers disposed at the points of a regular hexagonal lattice, said mirror having a shape which is defined such that by defining a hexagonal region $R_1$ in an X,Y plane having equal sides of length S and oriented with two of its sides parallel to the Y axis, $(\sqrt{3})S$ being equal to the spacing between the centers at adjacent points of the lattice, and by defining regions $R_{N+1}$ in the X,Y plane for any integer $N \geq 1$, such that $$R_{N+1} = (aR_N) U (U_{M=0,1,2,3,4,5}(aR_N + (X(M,N),Y(M,N)))),$$

where $a = 1/\sqrt{7}$, and the translation vector defined by $$X(M,N) = \sqrt{3} \cos(\pi M/3 + (N-2)\Phi) \text{ and}$$

$$Y(M,N) = -\sqrt{3} \sin(\pi M/3 + (N-2)\Phi),$$

where the angle $\Phi$ in radians is equal to arctangent $\sqrt{3}/2$, then $R_{N+1}$ defines the planar shape and size of each of said mirrors.

* * * * *